(12) United States Patent
Currier et al.

(10) Patent No.: US 11,383,184 B2
(45) Date of Patent: Jul. 12, 2022

(54) FILTER ELEMENT WITH A SPACER

(71) Applicant: Cummins Filtration IP, Inc., Columbus, IN (US)

(72) Inventors: Wilson L. Currier, Cookeville, TN (US); Peter K. Herman, Stoughton, WI (US); Arun P. Janakiraman, Stoughton, TN (US); Jonathan D. Sheumaker, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 80 days.

(21) Appl. No.: 16/632,809

(22) PCT Filed: Jul. 23, 2018

(86) PCT No.: PCT/US2018/043265
§ 371 (c)(1),
(2) Date: Jan. 21, 2020

(87) PCT Pub. No.: WO2019/023121
PCT Pub. Date: Jan. 31, 2019

(65) Prior Publication Data
US 2021/0154602 A1    May 27, 2021

Related U.S. Application Data

(60) Provisional application No. 62/537,752, filed on Jul. 27, 2017.

(51) Int. Cl.
*B01D 29/21* (2006.01)
(52) U.S. Cl.
CPC ........ *B01D 29/21* (2013.01); *B01D 2201/127* (2013.01); *B01D 2201/295* (2013.01)

(58) Field of Classification Search
CPC .............. B01D 2201/127; B01D 46/523
See application file for complete search history.

(56) References Cited

U.S. PATENT DOCUMENTS 3,280,985 A * 10/1966 Czerwonka ............ B01D 29/07
                                                            210/489
4,452,619 A    6/1984   Wright et al.
(Continued)

FOREIGN PATENT DOCUMENTS

CN            1278744 A       1/2001
WO    WO-2016/077338 A1      5/2016

OTHER PUBLICATIONS

Purolator Premium Oil Filters Brochure, Mann Hummel Purolator Filters LLC, Raleigh NC, 47607, 2016, 6 pages.
(Continued)

*Primary Examiner* — Benjamin M Kurtz
(74) *Attorney, Agent, or Firm* — Foley & Lardner LLP

(57) ABSTRACT

A filter element for filtering a fluid that comprises a pleated filter media and a support structure. The pleated filter media comprises pleats that define an upstream gap along an upstream surface of the pleated filter media and a downstream gap along a downstream surface of the pleated filter media. The support structure extends along the downstream surface of the pleated filter media and supports the pleats. The support structure is folded into two layers comprising a first layer and a second layer within the downstream gap. The first layer inner surface and the second layer inner surface are positioned adjacent to each other within the downstream gap. The support structure comprises at least one spacer that increases a distance between the first layer outer surface and the second layer outer surface such that the differential pressure drop through portion of the support structure that is within the downstream gap is decreased.

7 Claims, 15 Drawing Sheets

(56) References Cited

U.S. PATENT DOCUMENTS 5,552,048 A * 9/1996 Miller .................. B01D 29/012
  210/489
6,000,558 A     12/1999 Proulx et al.
2003/0070238 A1  4/2003 Radomyselski et al.
2004/0060858 A1  4/2004 Lucas et al.
2006/0065592 A1  3/2006 Terres et al.

OTHER PUBLICATIONS

International Search Report and Written Opinion Issued for PCT/US2018/043265, dated Oct. 2, 2018, 12 pages.

* cited by examiner

| | Mesh Weave | | Warp (in) | Fill/Shute (in) | Weave Type | Abs Rating (μm) | Thickness (in) | Solidty (%) | Warp/Fill Weave Ratio | Warp/Fill Wire Dia Ratio |
|---|---|---|---|---|---|---|---|---|---|---|
| 150 | 12 | X 64 | 0.0165 | 0.0165 | PDW | 300 | 0.0476 | 29.25% | 0.188 | 1.39 |
| | 14 | X 88 | 0.019 | 0.012 | PDW | 300 | 0.0299 | 33.68% | 0.159 | 1.58 |
| | 24 | X 110 | 0.014 | 0.01 | PDW | 125 | 0.0264 | 33.09% | 0.218 | 1.40 |
| | 30 | X 150 | 0.009 | 0.007 | PDW | 112 | 0.0197 | 29.49% | 0.200 | 1.29 |
| | 40 | X 200 | 0.007 | 0.0055 | PDW | 80 | 0.0157 | 30.42% | 0.200 | 1.27 |
| | 50 | X 250 | 0.0055 | 0.004 | PDW | 63 | 0.0126 | 25.05% | 0.200 | 1.38 |
| | 30 | X 250 | 0.01 | 0.008 | TDW | 100 | 0.0256 | 49.32% | 0.120 | 1.25 |
| | 80 | X 700 | 0.004 | 0.003 | TDW | 34 | 0.0102 | 48.61% | 0.114 | 1.33 |
| | 120 | X 400 | 0.004 | 0.0025 | TDW | 42 | 0.0091 | 21.73% | 0.300 | 1.60 |
| | 165 | X 800 | 0.0028 | 0.002 | TDW | 28 | 0.0067 | 37.61% | 0.206 | 1.40 |
| | 165 | X 1400 | 0.0028 | 0.0016 | TDW | 15 | 0.0059 | 47.81% | 0.118 | 1.75 |
| | 200 | X 600 | 0.0024 | 0.0018 | TDW | 32 | 0.0057 | 26.88% | 0.333 | 1.33 |
| | 200 | X 1400 | 0.0028 | 0.0016 | TDW | 11 | 0.0055 | 51.30% | 0.143 | 1.75 |
| | 325 | X 2300 | 0.0014 | 0.001 | TDW | 6 | 0.0035 | 51.66% | 0.141 | 1.40 |
| | Transverse flow mesh - Plain Square Weave (PSW) | | | | | | | | | |
| 50 | 18 | X 14 | 0.015 | 0.007 | PSW | N/A | 0.022 | 2.77% | 1.286 | 2.14 |
| | 25 | X 14 | 0.015 | 0.007 | PSW | N/A | 0.022 | 2.89% | 1.786 | 2.14 |
| | 30 | X 12 | 0.015 | 0.007 | PSW | N/A | 0.022 | 2.63% | 2.500 | 2.14 |

FILTER ELEMENT WITH A SPACER

CROSS REFERENCE TO RELATED APPLICATIONS

The present application is a national stage of PCT Application No. PCT/US2018/043265, filed Jul. 23, 2018 which claims priority to U.S. Provisional Patent Application No. 62/537,752, filed Jul. 27, 2017. The contents of these applications are incorporated herein by reference in their entirety.

FIELD

The present invention relates generally to a filter element with pleated filter media for use within a filter assembly.

BACKGROUND

Conventional filter elements can be used to filter a variety of different fluids within a filter assembly. As shown in FIG. 1, a conventional pleated filter element 130 may include corrugated or pleated filter media 140 that is embossed or mesh-supported to filter the fluid. The conventional pleated filter media 140 includes multiple corrugations, embossments, or mesh, or pleats that form a flow channel gap separation 141 (as shown in FIG. 2) between the pleats. Accordingly, the pleated filtered media 140 defines upstream flow channels or gaps 142 between pleats along the upstream surface of the pleated filter media 140 and downstream flow channels or gaps 144 between pleats along the downstream surface of the pleated filter media 140. As shown in FIG. 1, the fluid enters into the upstream flow gap 142 between the pleats of the pleated filter media 140, flows in the transverse direction toward the pleated filter media, then changes direction and flows in a direction substantially perpendicular to the transverse direction through the pleated filter media 140, then exits the pleated filter media by flowing in the transverse flow direction radially toward and through the downstream flow gap 144 toward the center tube.

As shown in FIGS. 3A-3B, the conventional pleated filter element 130 may include a conventional support structure 150 positioned along and supporting the downstream surface of the pleated filter media 140 to create an exit flow channel that allows the filtered fluid to flow through and exit the pleated filter media 140 radially at the end of the downstream gap 144. The support structure 150 extends along the downstream side of the pleated filter media 140 in order to and provide support for the entire pleated filter media area 140, including wrapping around the inner pleat bend and the outer pleat bend of the pleated filter media 140. FIG. 4 shows optical micrographs of two different types of conventional wire mesh support structures 150 that can support the pleated filter media 140.

The support structure 150 is configured to provide high pressure support to the pleated filter media 140 and facilitate downstream drainage (i.e., transverse flow) in the downstream gap 144 between the pleats, in particular for high flowrate and/or pressure-drop applications (e.g., engine lube oil and hydraulic fluid filtration). Specifically, the support structure 150 maintains the downstream gap 144 between the pleats open, even during conditions with a high differential pressure across the pleated filter media 140. In high differential pressure conditions, the differential pressure typically exceeds 100 pounds per square inch differential (psid) during, for example, cold-start or a start up with a partially plugged filter.

As shown in FIGS. 5-6, the support structure 150 may comprise a mesh. Such a support structure 150 comprises multiple wires 152 that are oriented in different directions. The wires 152 may all have the same diameter 153 and are spaced apart from each other by a distance 155. As shown in FIG. 5, the thickness 151 of a single layer of the support structure 150 is approximately equal to twice the diameter 153 of the wires 152 (since the wires 152 have the same diameter 153). As shown in FIG. 6, the thickness 151 of two layers of the support structure 150 (since the support structure 150 doubled within the downstream flow gap 144, for example) is approximately equal to four times the diameter 153 of the wires 152. Therefore, the transverse flow width 145 of the downstream gap 144 is also approximately equal to four times the diameter 153 of the wires 152.

The downstream gap ratio (Gr) depends on the diameter 153 of the wires and the transverse flow width 145 of the downstream gap 144. Since the transverse flow width 145 of the downstream gap 144 is approximately equal to four times the diameter 153 of the wires 152, the downstream gap ratio is approximately 1.00 in conventional filter elements 130 that include the support structure 150.

It has been conventionally believed that the support structure 150 allows the filter element 130 to have sufficient exit-gap drainage, thereby providing an acceptably low initial differential pressure drop (dP) of the filter element 130. However, recent test-method development, subsequent testing, and analysis (such as fluid-dynamic model calculations) have proven that the overall differential pressure drop has not been optimized and is not as low as desirable. There are a number of different factors that affect the overall differential pressure drop.

FIGS. 7A-7E show fluid flowing through the filter element 130 with the corresponding sources of differential pressure drop. FIG. 7A shows the contraction or inertial loss differential pressure loss, which is due to entrance contraction or inertial losses of the fluid as the fluid enters into the upstream gap 142 of the pleated filter media 140. The contraction differential pressure loss is correlated to the square of the velocity (or volumetric flow rate) of the fluid and contributes a relatively small amount to the overall differential pressure drop.

FIG. 7B shows the upstream gap differential pressure loss, which is due to viscous losses as the fluid flow enters into and flows radial inwardly through the upstream gap 142. The viscous losses are linearly correlated to the channel-gap velocity (or volumetric flow rate) of the fluid and the upstream gap differential pressure loss contributes a relatively small amount to the overall differential pressure drop. The velocity of the fluid as the fluid flow radially inwardly through the upstream gap 142 decreases as the fluid flows further radially inwardly due to the loss of fluid flow as the fluid flows (approximately uniformly) through the pleated filter media 140.

FIG. 7C shows the media differential pressure loss, which is due to the fluid flowing through the surface area of the pleated filter media 130. The media differential pressure loss varies linearly with the viscosity and velocity of the fluid and is inversely proportional to the filter media permeability (according to Darcy's law that described the flow of a fluid through a porous medium). The media differential pressure loss contributes relatively significantly to the overall differential pressure drop. It is noted that the flow through the pleated filter media 140 may be relatively uniform or may be shifted toward the inner diameter of the pleated filter media 140 due to the high radial pressure gradient created by the downstream gap differential pressure loss.

The filter media differential pressure loss due to media compressibility also contributes relatively significantly to the overall differential pressure drop. The filter media compresses as a function of the media differential pressure drop. Therefore, as the differential pressure drop increases, the media compression increases, which increases overall differential pressure drop (e.g., as the filter media compresses, the permeability of the pleated filter media 140 is reduced and media solidity increases).

The differential pressure loss due to upstream pleat pinch off further contributes to the overall differential pressure drop. This differential pressure loss, due to flow-induced pleat deflection, reduces the effective flow area of the pleated filter media 140, and increases the downstream gap differential pressure loss as well, since exit-channel velocities increase in areas that remain open to flow (i.e., areas without pleat-pinch).

FIG. 7D shows the downstream gap differential pressure loss, which is due to the viscous drag that is created when the fluid flows radially from the pleated filter media 130 into the support structure 150 and as the fluid moves in the transverse flow direction through the downstream gap 144. The degree of viscous loss depends on the transverse permeability of the support structure 150 (which is doubled up within the downstream gap 144). As the fluid flows through the support structure 150 within the downstream gap 144, the fluid "wiggles" between small gaps between the mesh wires within the support structure 150 until the fluid reaches the exit point of the support structure 150 at the inner diameter of the filter element 130. The average velocity of the fluid within the downstream gap 144 increases linearly as the fluid approaches the inner diameter of the filter element 130 due to the accumulation of the semi-uniform flow through the pleated filter media 140. The downstream gap differential pressure loss is the dominant differential pressure drop source contributing to the overall differential pressure drop within filter elements 130 with the pleated filter media 140 and the support structure 150.

FIG. 7E shows exit expansion differential pressure loss, which is due to the fluid flow expanding once the fluid exits from the downstream gap 144 and accordingly has inertial jetting exit losses and a loss of kinetic energy. The exit expansion differential pressure loss contributes a relatively small amount to the overall differential pressure drop.

SUMMARY

Various embodiments provide for filter element for filtering a fluid that comprises a pleated filter media and a support structure. The pleated filter media comprises pleats that define an upstream gap along an upstream surface of the pleated filter media and a downstream gap along a downstream surface of the pleated filter media. The support structure extends along the downstream surface of the pleated filter media and supports the pleats. The support structure is folded into two layers comprising a first layer and a second layer within the downstream gap of the pleated filter media. The first layer comprises a first layer outer surface and a first layer inner surface. The second layer comprises a second layer outer surface and a second layer inner surface. The first layer inner surface and the second layer inner surface are adjacent to each other within the downstream gap. The support structure comprises at least one spacer that increases a distance between the first layer outer surface and the second layer outer surface such that the differential pressure drop through portion of the support structure that is within the downstream gap is decreased.

Various embodiments disclosed herein provide a number of different benefits, including further reducing the differential pressure drop (in particular, the downstream gap differential pressure loss, which is the major contributor of the overall differential pressure drop) and thereby minimizing parasitic losses. Furthermore, the downstream drainage flow may also be improved.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a filter element for a filter assembly. The filter element comprises pleated filter media and a downstream support structure that comprises at least one spacer The spacer reduces the downstream gap differential pressure loss (and therefore also the overall differential pressure drop (dP)) of the filter element by further increasing the downstream gap between the pleats, which increases the transverse intrinsic permeability of the support structure, which improves (i.e., lowers) the transverse flow restriction of the support structure. Accordingly, the spacer improves the downstream drainage flow of the filter element and reduces the overall amount of parasitic losses of the filter element. Parasitic loss is defined as the volumetric flow rate*dP and has the unit of "power." The spacer is able to improve the hot and/or cold flow verses differential pressure drop of the filter element.

By reducing the overall filter differential pressure drop, the parasitic losses (e.g., the fuel economy, by, for example, reducing the pumping power, which is equal to dP*flowrate) imposed on the engine from the filter element and the efficiency of the filter element is improved. Furthermore, a lower cold-flow differential pressure drop can prevent the bypass valve (where the bypass valve is typically located on the filter head or may be mounted on filter element endcap itself) from prematurely opening or at least minimize the duration of time that the bypass valve spends "open" during the warmup period, which reduces the amount of potentially-dirty (e.g., unfiltered) oil that bypasses to the clean side of the filter element. Additionally, a lower cold-flow differential pressure drop also decreases the amount of time until the oil rifles are pressurized. With a lower amount of time until oil rifles pressurization, the amount of wear to the critical bearings (e.g., the turbocharger, the main crankshaft bearings, etc.) is reduced, which improves the overall engine life.

It is noted that certain features shown in the figures, such as the thickness of the pleated filter media and the support structure, has been exaggerated in the figures for clarity.

Filter Assembly

Figure 1:
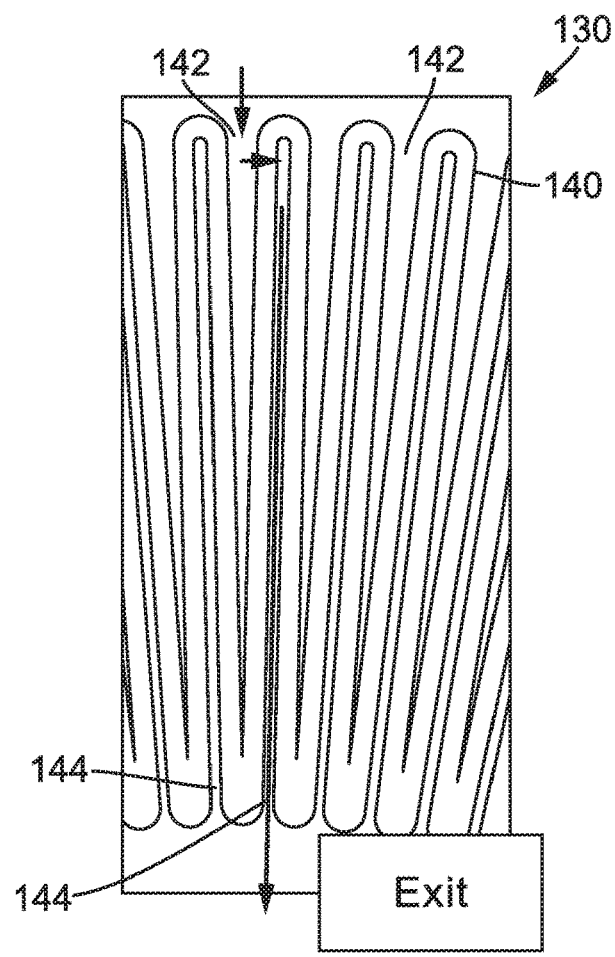
FIG. 1 is a cross-sectional view of a conventional filter element.
Figure 2:
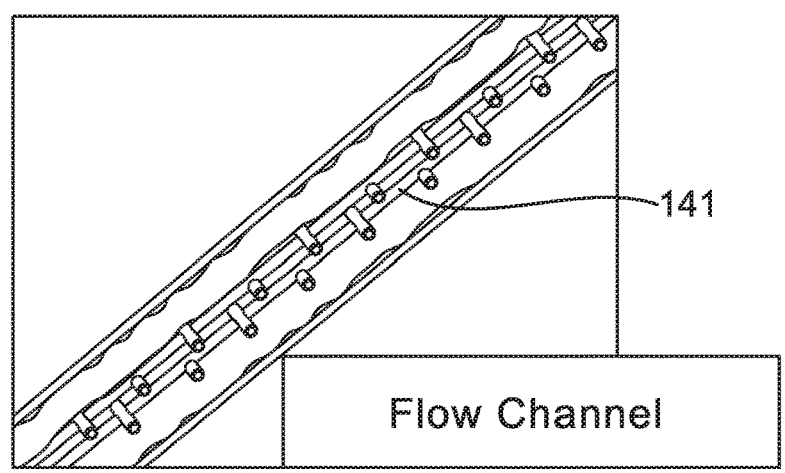
FIG. 2 is a perspective view of a flow channel of a conventional filter element.
Figure 3A:
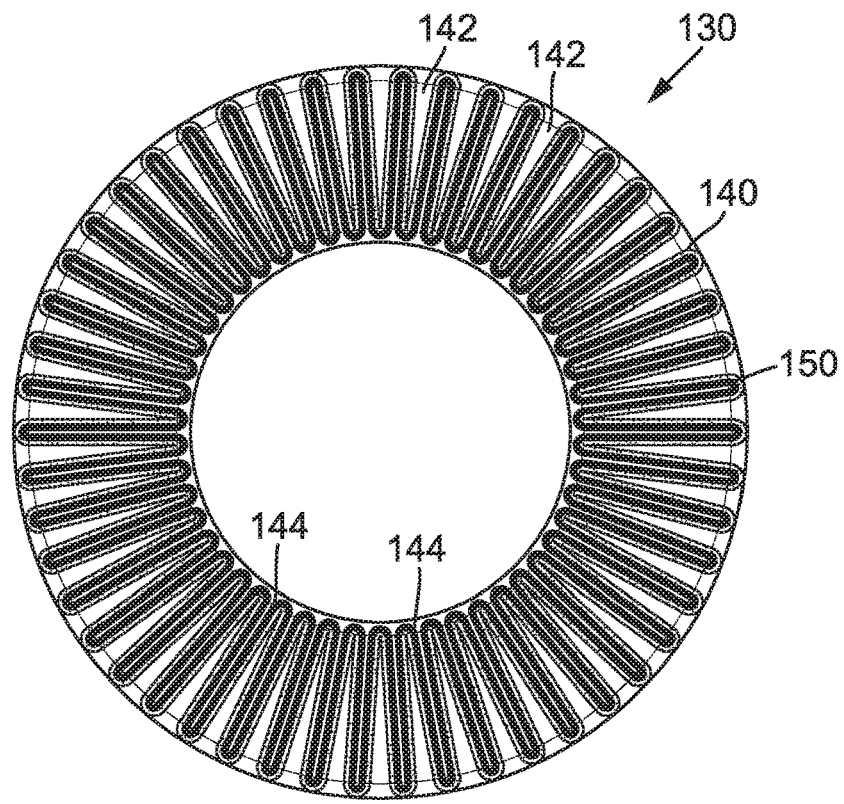
FIG. 3A is a cross-sectional view of a conventional filter element.
Figure 3B:
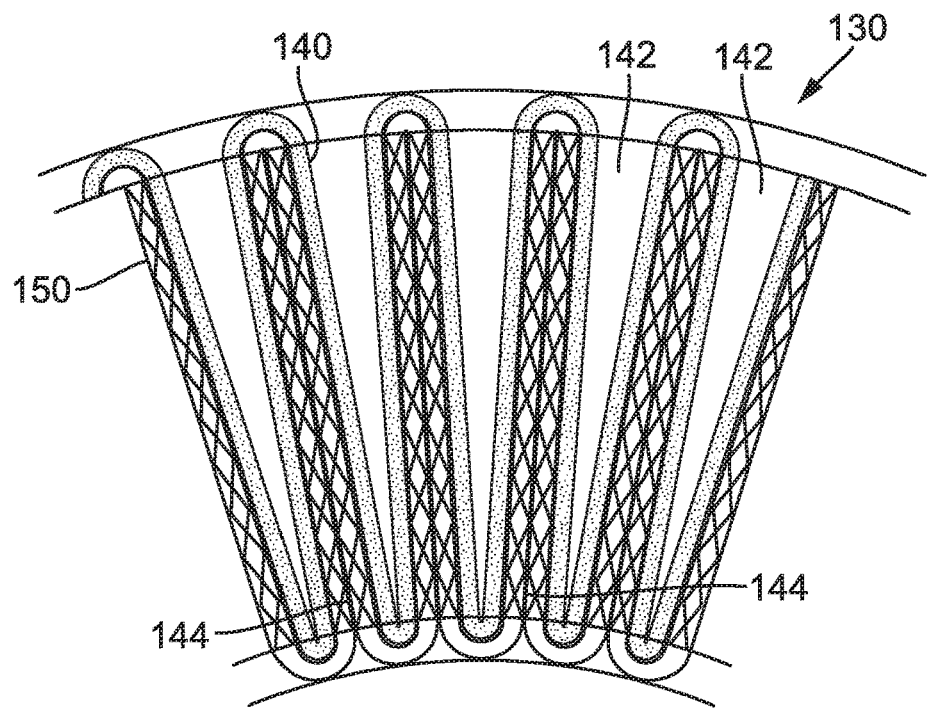
FIG. 3B is an enlarged view of a portion of the conventional filter element of FIG. 3A.
Figure 4:
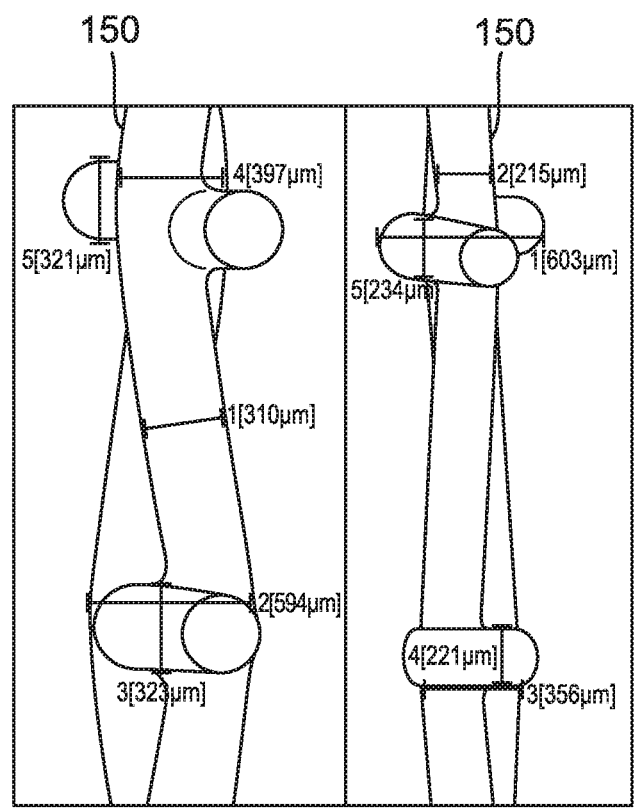
FIG. 4 is a micrograph of a conventional support structure.
Figure 5:
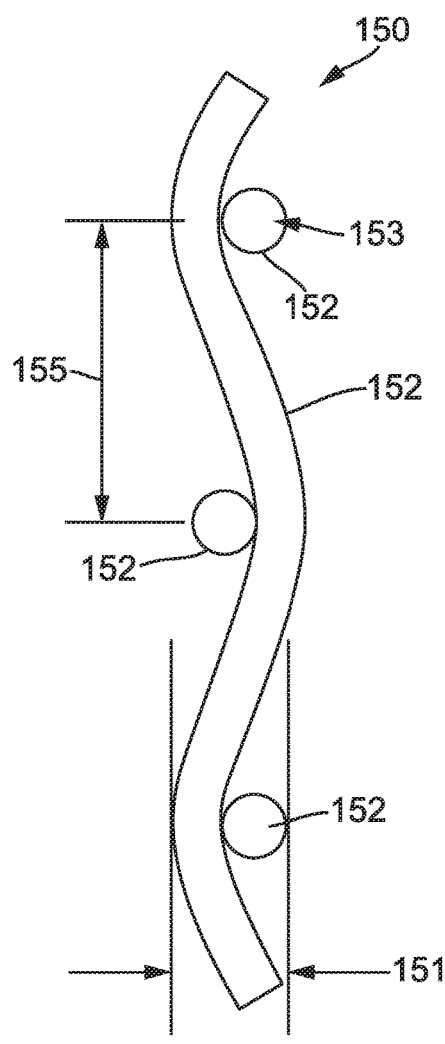
FIG. 5 is a cross-sectional view of a portion of a conventional support structure.
Figure 6:
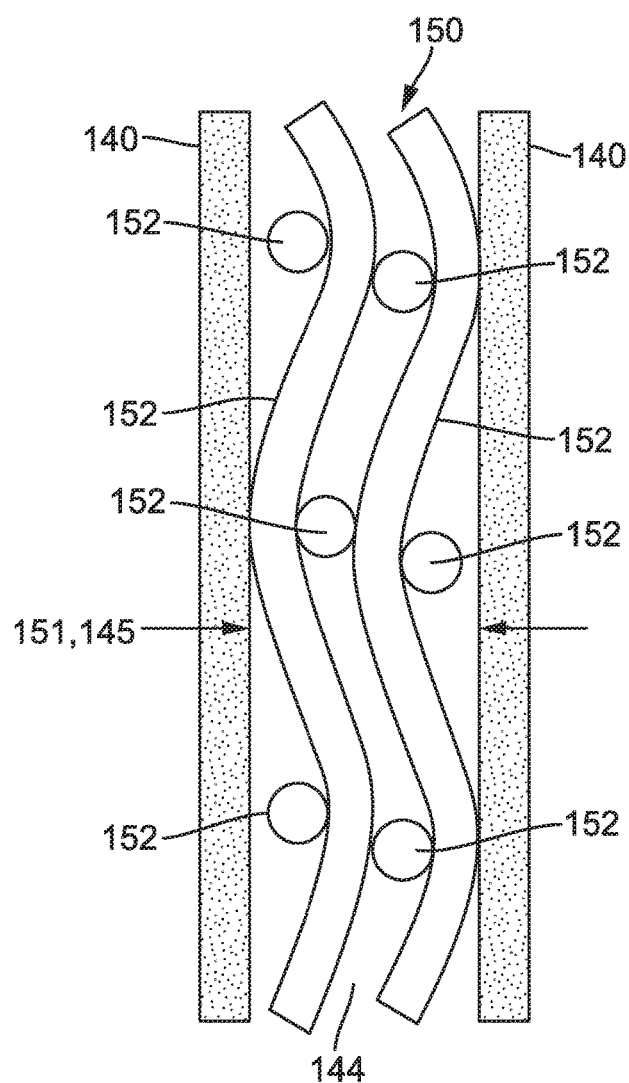
FIG. 6 is a cross-sectional view of a portion of the conventional support structure of FIG. 5 within a conventional pleated filter media.
Figure 7A:
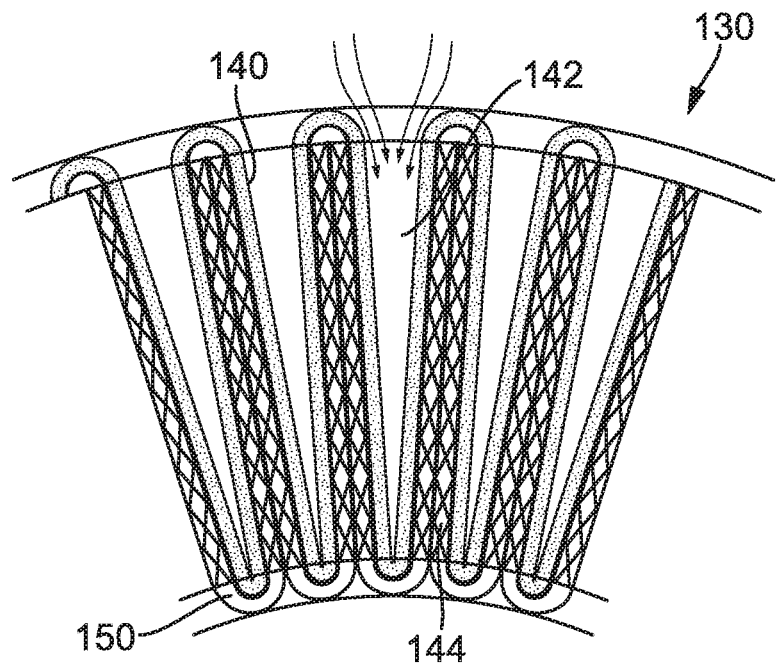
FIG. 7A is a cross-sectional view of fluid flowing into the conventional filter element of FIG. 3A.
Figure 7B:
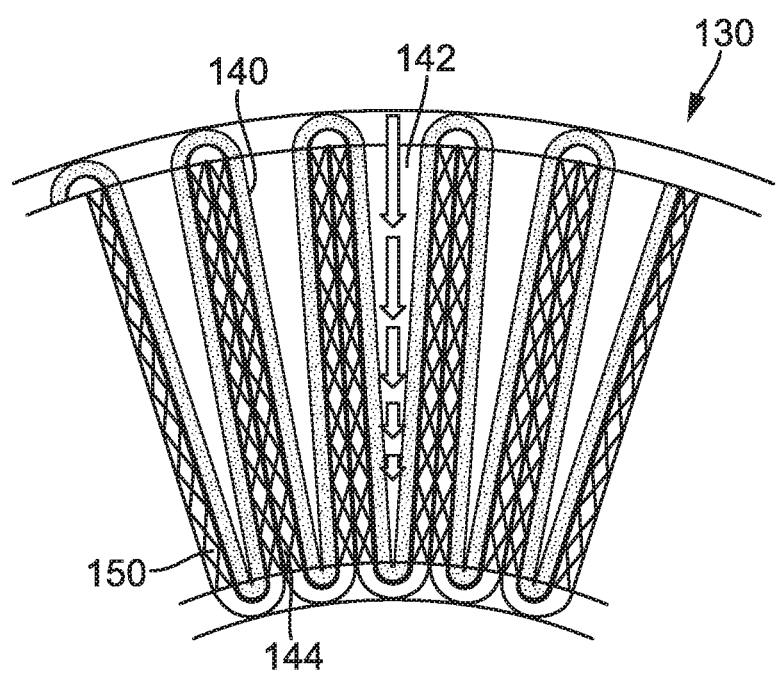
FIG. 7B is a cross-sectional view of fluid flowing through the conventional filter element of FIG. 3A.
Figure 7C:
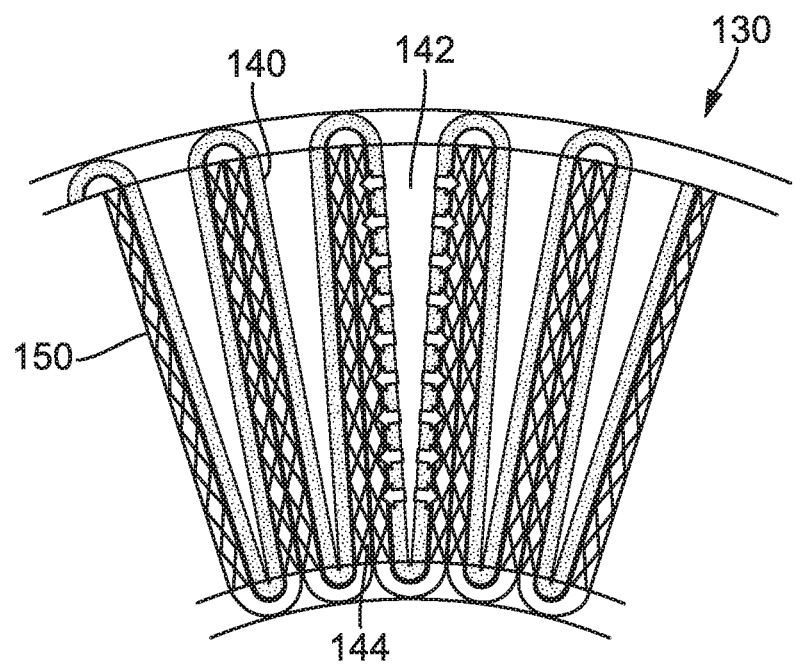
FIG. 7C is a cross-sectional view of fluid flowing through the conventional filter element of FIG. 3A.
Figure 7D:
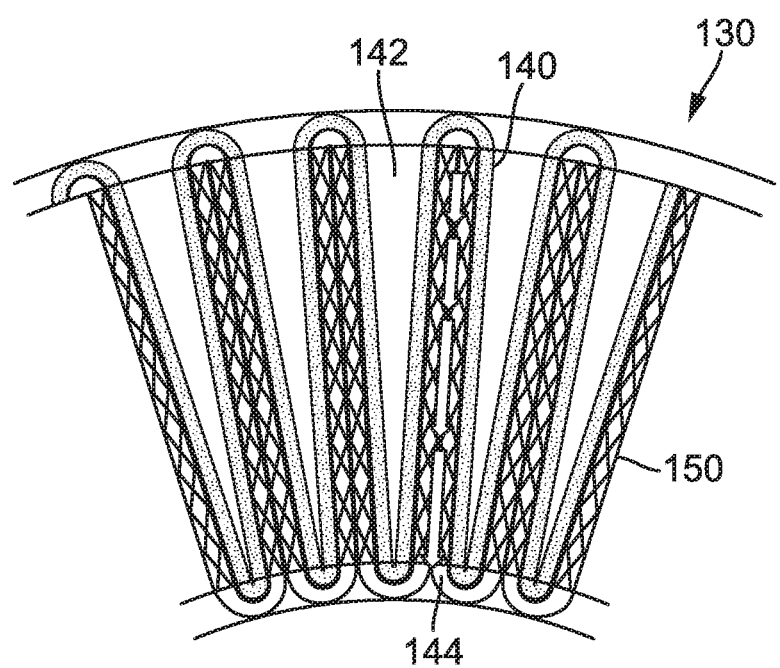
FIG. 7D is a cross-sectional view of fluid flowing through the conventional filter element of FIG. 3A.
Figure 7E:
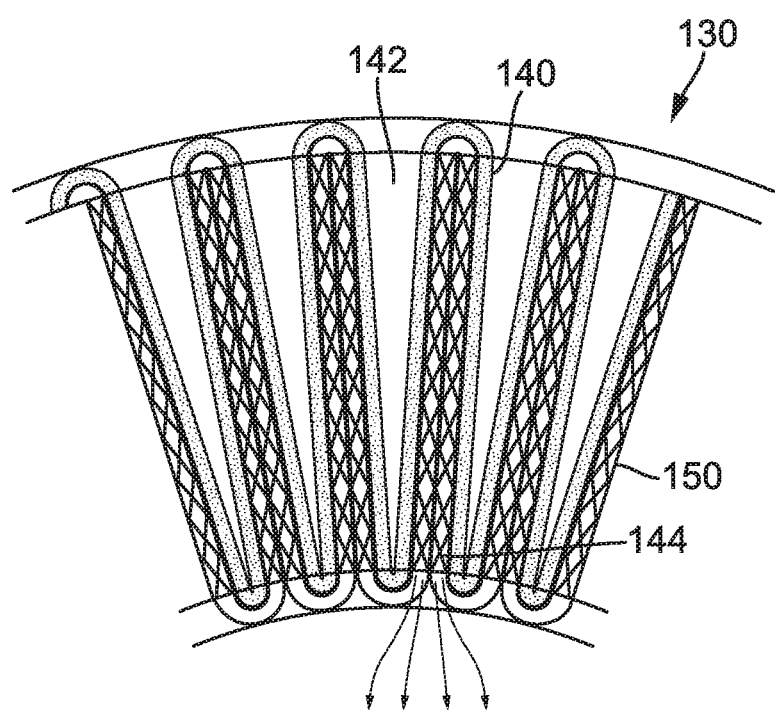
FIG. 7E is a cross-sectional view of fluid flowing out from the conventional filter element of FIG. 3A.
Figure 8A:
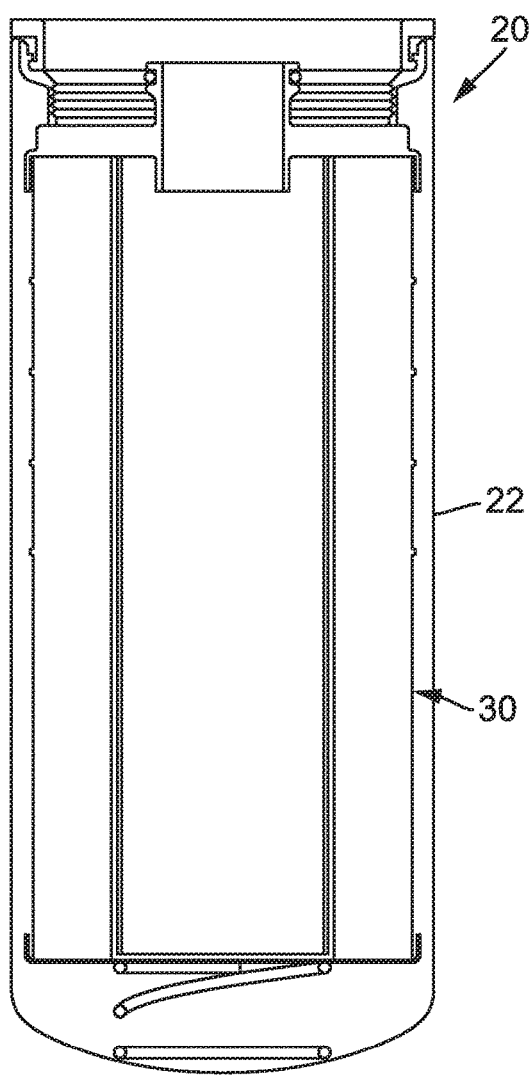
FIG. 8A is a filter assembly according to one embodiment.
Figure 8B:
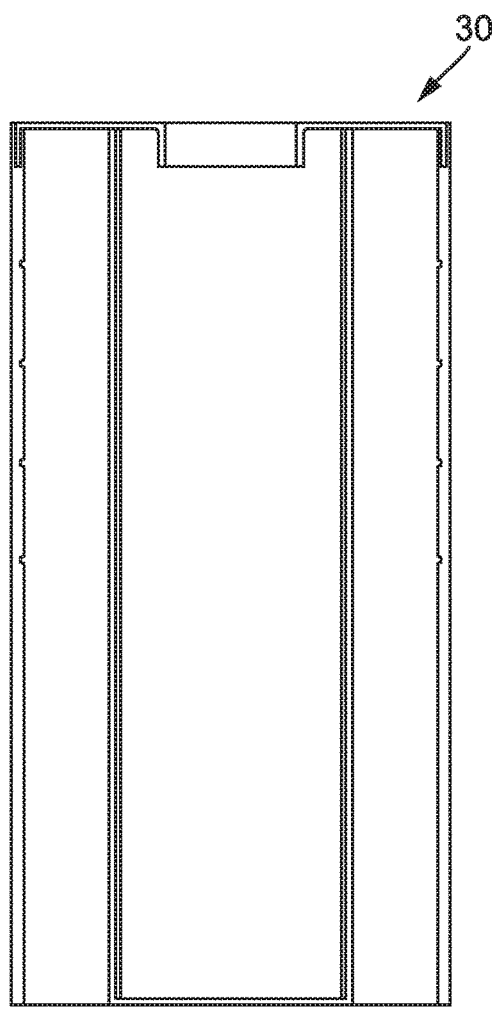
FIG. 8B is a filter element that can be positioned within the filter assembly of FIG. 8A.
Figure 9:
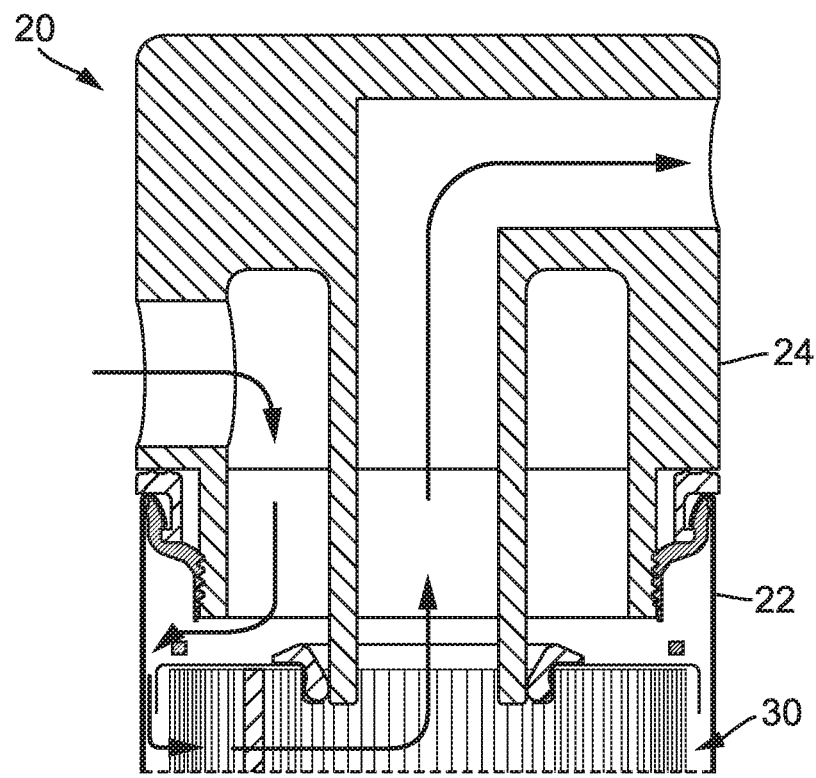
FIG. 9 is a representative view of flow through a filter assembly according to one embodiment.

A filter cartridge (represented at 20 in FIG. 8A) is configured to filter a fluid and may comprise a filter housing 22 and a filter element 30 positioned within the filter housing 22. The filter cartridge is removably attachable to a filter head (represented at 24 in FIG. 9). FIG. 8A depicts a representative filter cartridge 20, and FIG. 8B depicts a representative filter element 30 (comprising filter media and at least two endplates). FIG. 9 demonstrates a representative flow path through the filter cartridge 20 and the filter head 24 when the filter cartridge 20 is properly installed. As described further herein, the support structure 50 may be incorporated within the filter assembly shown in FIGS. 8A-9.

The filter assembly may be used for a variety of different types of fluid filtration, including but not limited to lube, hydraulic fluid, or fuel filtration. Accordingly, the fluid being filtered may be a variety of different fluids (such as a liquid) including but not limited to lube, hydraulic fluid, and fuel.

Filter Element

Figure 11B:
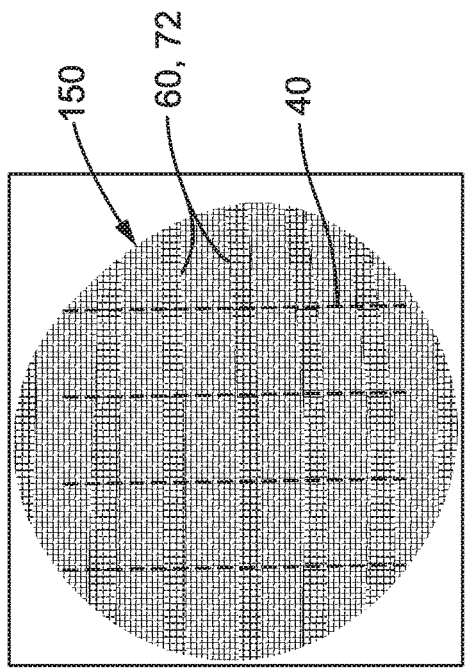
FIG. 11B is a plane view of the support structure within the filter element of FIG. 11A.
Figure 11A:
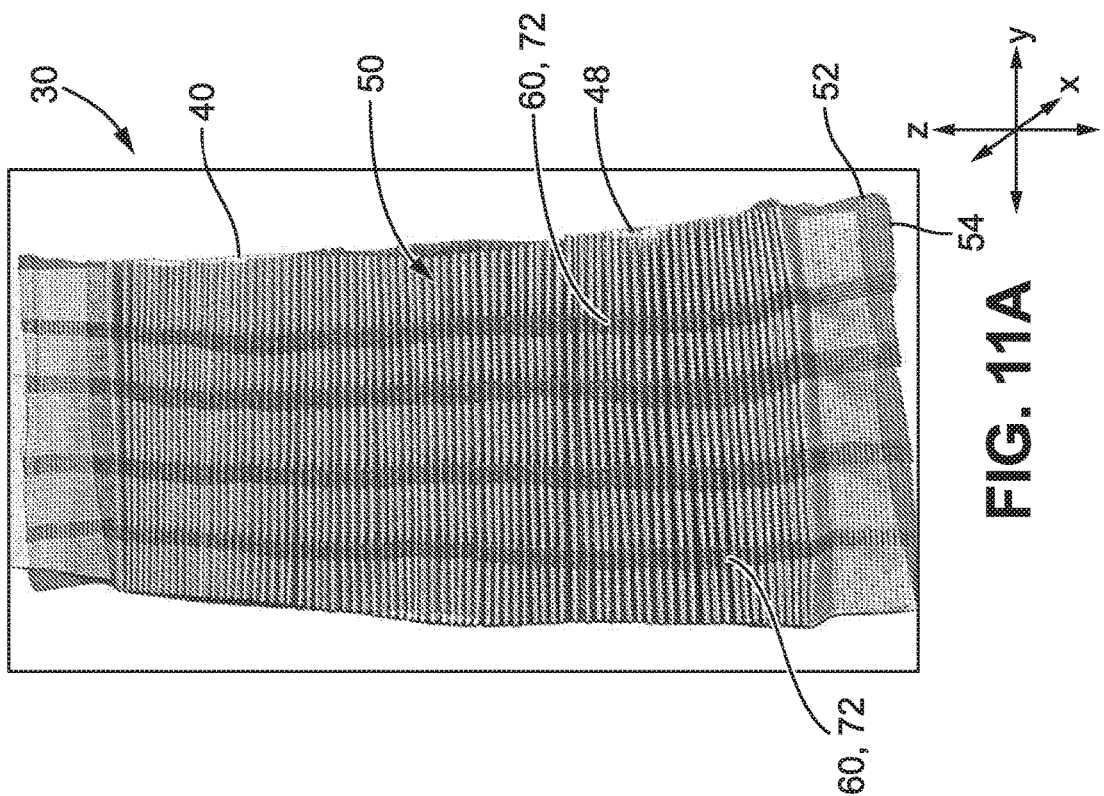
FIG. 11A is a perspective view of a portion of a filter element according to another embodiment.

The filter element 30 (a portion of which is shown in FIG. 11A) comprises pleated filter media 40 for filtering the fluid and support structure 50 to support the pleated filter media 40 (both of which are described further herein).

The filter element 30 may be used within a variety of different filter element applications, such as a lube filter element, a hydraulic filter element, or a fuel filter element. Accordingly, the filter element 30 may be used for a variety of different applications, such as engine lube oil filtration, StrataPore® lube applications, hydraulic fluid filtration or applications, and/or fuel applications.

Pleated Filter Media

Figure 10:
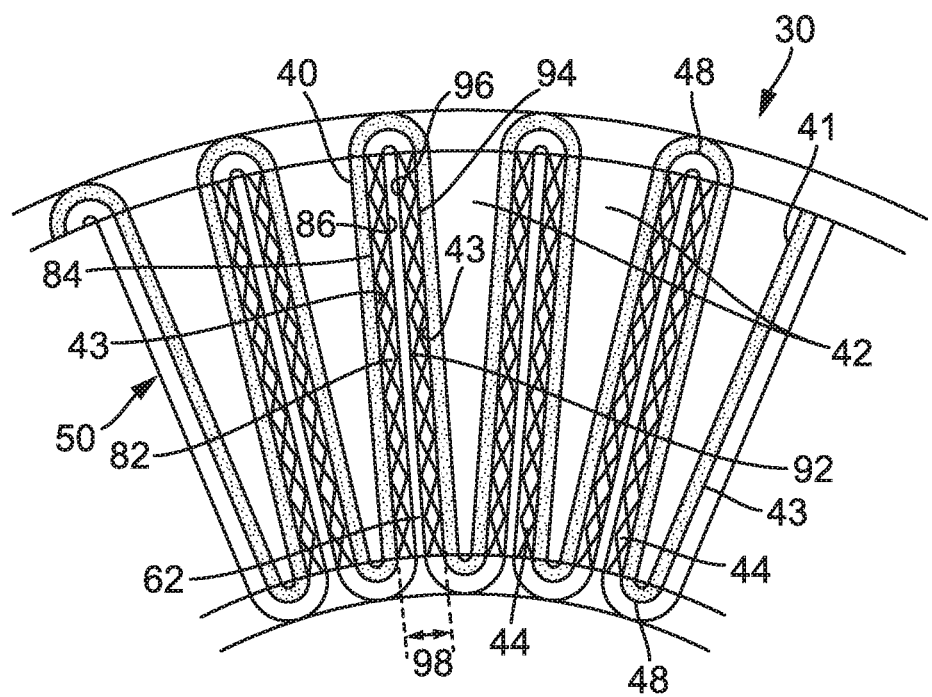
FIG. 10 is a cross-sectional view of a portion of a filter element according to one embodiment.

The corrugated or pleated filter media 40 of the filter element 30 is configured to filter fluid. As shown in FIG. 10, the pleated filter media 40 comprises an upstream surface 41 and a downstream surface 43. The fluid enters into the pleated filter media 40 through the upstream surface 41 and exits out from the pleated filter media 40 through the downstream surface 43. The pleated filter media 40 further comprises multiple corrugations or pleats 48 that define pleat channels or gaps between the pleats 48. Accordingly, the pleats 48 define a pleat-entrance or upstream channels or gaps 42 between pleats 48 along the upstream surface 41 of the pleated filter media 40 and a pleat-exit or downstream channels or gaps 44 between pleats 48 along the downstream surface 43 of the pleated filter media 40.

In order to filter the fluid, the fluid flows through the pleated filter media 40. Fluid enters into and flows through at least a portion of the upstream gap 42 between the pleats 48 of the pleated filter media 40, flows in the transverse direction into the upstream surface 41 of the pleated filter media, through the pleated filter media 40, and out from the downstream surface 43 of the pleated filter media 40, flows through at least a portion of the downstream gap 44, and exits radially from the downstream gap 44 toward, for example, a center tube.

The pleated filter media 40 may be a variety of different types of filter media, such as synthetic nonwoven filter media, microglass wet or dry-laid filter media, polymeric melt-blown filter media, spun-bond filter media, or StrataPore® filter media, which utilizes synthetic polymeric microfiber media.

Support Structure

As shown in FIG. 10, the support structure 50 of the filter element 30 is positioned downstream from the pleated filter media 40 to create an exit channel through the downstream gap 44 for the filtered fluid to move through after it has exited the pleated filter media 40 (in order to exit the filter element 30). As described further herein, the support structure 50 comprises at least one spacer 60 (as shown, for example, in FIG. 11A) that further spaces out the support structure 50 (compared to the conventional support structure 150 (as shown, for example, in FIG. 12)) in order to improve the transverse flow characteristics of the filter element 30 and reduce the overall differential pressure drop of the filter element 30.

Specifically, the support structure 50 is positioned along and supports the entire downstream surface 43 of the pleated filter media 40 (in particular, the support structure 50 supports each of the pleats 48 from the downstream surface 43 of the pleated filter media 40). The support structure 50 extends around the circumference of the downstream surface 43 of the pleated filter media 40. The support structure 50 may optionally extend around the entire downstream surface 43. For example, the support structure 50 extends along the downstream surface 43 of each of the pleats 48 and wraps around the inner pleat bend and the outer pleat bend of the pleated filter media 40. Since the support structure 50 extends along the entire downstream surface 43 of the pleated filter media 40, the support structure 50 is folded over itself or doubled-up within the downstream gap 44 (as shown in FIG. 10).

As shown in FIG. 10, the support structure 50 is folded into two layers comprising a first layer 82 and a second layer 92 within the downstream gap 44 of the pleated filter media 40. The first layer 82 comprises a first layer outer surface 84 and a first layer inner surface 86. The second layer 92 comprising a second layer outer surface 94 and a second layer inner surface 96. The first layer inner surface 86 and the second layer inner surface 96 are adjacent to each other within the downstream gap 44. The first layer outer surface 84 and the second layer outer surface 94 each abut and support the downstream surface 43 of the pleated filter media 40 within the downstream gap 44. According to one embodiment, the first layer outer surface 84 is an upstream surface relative to the first layer inner surface 86, and the first layer inner surface 86 is a downstream surface relative to the first layer outer surface 84. Furthermore, the second layer outer surface 94 is an upstream surface relative to the second layer inner surface 96 and the second layer inner surface 96 is a downstream surface relative to the second layer outer surface 94.

The support structure 50 is configured to provide high pressure support to the pleated filter media 40 and facilitate downstream drainage in the downstream gap 44 between the pleats 48, in particular for high flowrate and/or pressure-drop applications (e.g., engine lube oil and hydraulic fluid filtration). Specifically, the support structure 50 maintains the downstream gap 44 between the pleats 48 open, even during conditions with a high differential pressure across the pleated filter media 40. In high differential pressure conditions, the differential pressure typically exceeds 100 pounds per square inch differential (psid) during, for example, cold-start or flow surface conditions.

The drainage, separation, or support material, layer, or structure 50 may comprise, for example, a mesh (e.g., a wire mesh), a screen, or a woven material. The support structure 50 may be constructed out of a variety of different materials, including but not limited to metals or polymers.

Figure 18A:
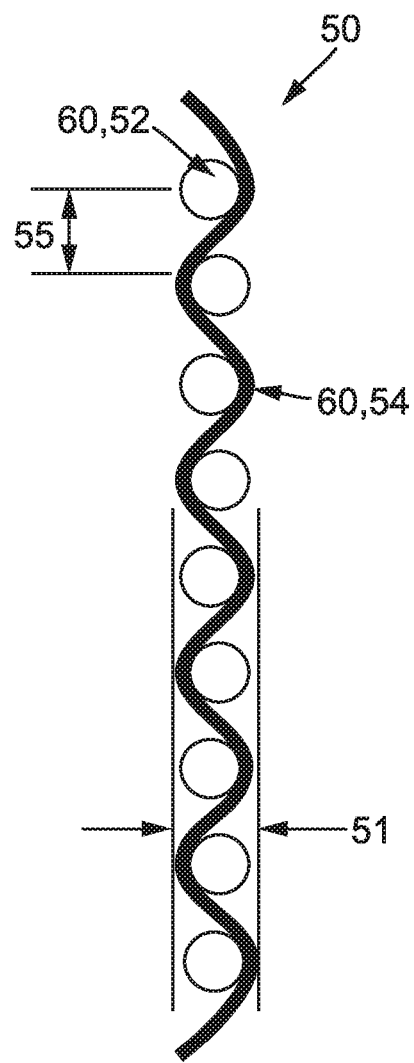
FIG. 18A is a cross-sectional view (from the view direction of FIG. 14) of a portion of a support structure according to still another embodiment.
Figure 18B:
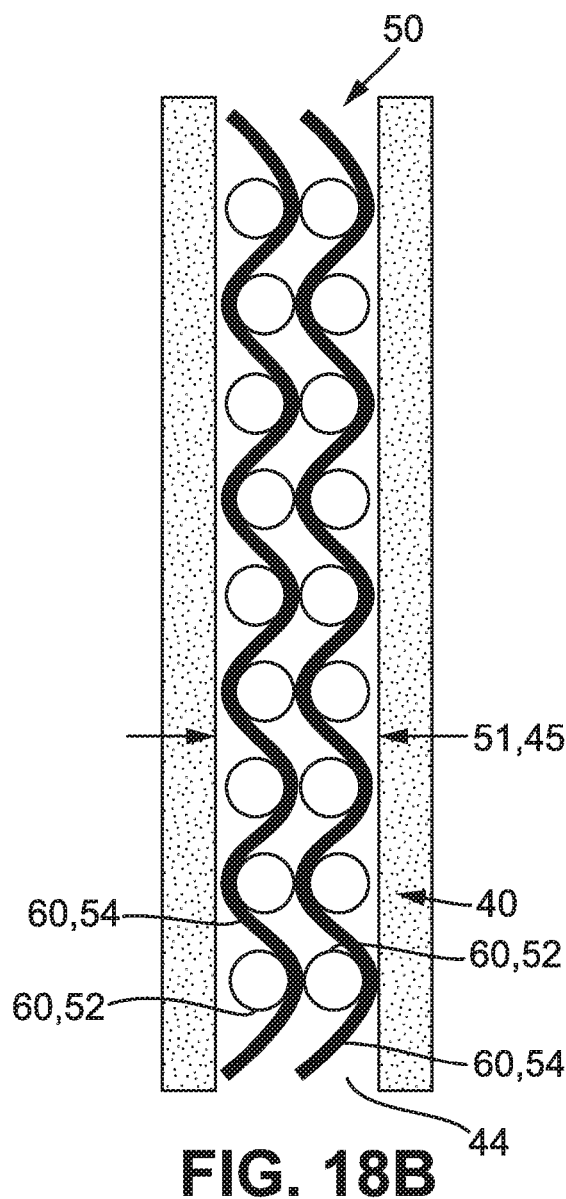
FIG. 18B is a cross-sectional view (from the view direction of FIG. 14) of the support structure of FIG. 18A within a pleated filter media.

In the embodiment depicted in FIG. 11A, the support structure 50 comprises a mesh that comprises radial-parallel wires 52 and radial-normal wires 54 that are oriented in different directions and form the mesh. The support structure 50 comprises a mesh that has a plain square or near-square weave such that the wires 52, 54 are substantially perpendicular to each other. The radial-parallel wires 52 extend substantially parallel to the radial direction of the pleated filter media 40. The radial-normal wires 54 extend substantially normal or perpendicular to the radial direction of the pleated filter media 40. According to one embodiment, the wires 52, 54 have the same width or diameters. According to another embodiment (as shown in FIGS. 18A-18B and as described further herein), the wires 52, 54 have different widths or diameters.

Spacer

As shown in FIG. 10, the support structure 50 comprises at least one spacer 60 that is configured to further space apart the support structure 50, which increases the distance 98 (as shown in FIG. 10) between the first layer outer surface 84 and the second layer outer surface 94 within the downstream gap 44 such that the differential pressure drop through the portion of the support structure 50 that is within the downstream gap 44 is decreased. Accordingly, the spacer 60 therefore also spaces apart the pleats 48 of the pleated filter media 40 and increases the size (i.e., transverse width or flow gap) of the downstream gap 44 between the pleats 48, which increases the available space for the flow path of the fluid exiting the pleated filter media 40.

By further increasing the size of the downstream gap 44 between the pleats 48, the spacer 60 dramatically reduces the downstream gap differential pressure loss across the downstream gap 44 (and therefore also the overall differential pressure drop (dP)) of the filter element 30, which increases the transverse intrinsic permeability of the support structure 50 within the downstream gap 44 and reduces the viscous drag, which improves (i.e., lowers) the transverse flow restriction of the support structure 50. Accordingly, the spacer 60 improves the downstream drainage flow of the filter element 30 and reduces the overall amount of parasitic losses of the filter element 30. According to various embodiments, the spacer 60 may help reduce the downstream gap differential pressure loss since the spacer 60 prevents two layers of the support structure 50 from nesting with each other within the downstream gap 44.

The drainage member, separation member, or spacer 60 (referred to collectively as "spacer" herein) creates an additional space or gap 62 within the downstream gap 44 in order to further space apart the support structure 50 and increase the size (i.e., transverse width or flow gap) of the downstream gap 44 between the pleats 48. The gap 62 is created by forming the support structure 50 to comprise the spacer 60.

Since the spacer 60 increases the transverse flow gap of the downstream gap 44, the filter element 30 has a downstream gap ratio that is less than 1.00. The transverse intrinsic permeability of the support structure 150 is correlated to the downstream gap ratio in that, as the downstream gap ratio increases, the transverse intrinsic permeability decreases. As the downstream gap ratio decreases from 1.00, the transverse width of the downstream gap 44 increases, which increases the transverse intrinsic permeability of the support structure 50 and within the downstream gap 44. As discussed above, in conventional filter elements 130 that include the conventional support structure 150, the downstream gap ratio is approximately 1.00.

Figure 15:
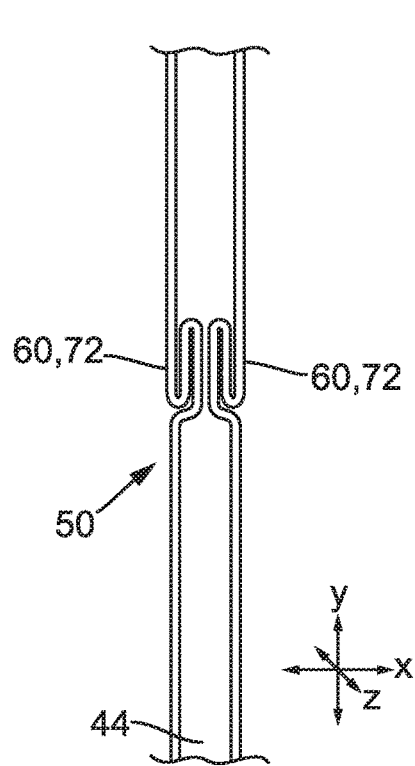
FIG. 15 is a cross-sectional view (from the view direction of FIG. 14) of a portion of a support structure according to one embodiment.
Figure 16:
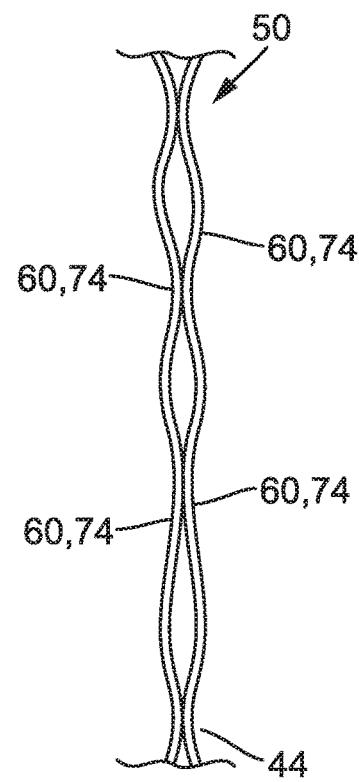
FIG. 16 is a cross-sectional view (from the view direction of FIG. 14) of a portion of a support structure according to another embodiment.
Figure 17:
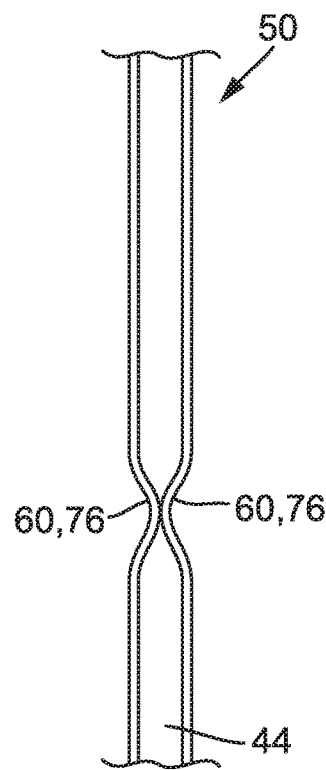
FIG. 17 is a cross-sectional view (from the view direction of FIG. 14) of a portion of a support structure according to yet another embodiment.

The spacer 60 may have a variety of different configurations that increase the width of the support structure 50 to reduce its transverse intrinsic permeability. For example, the spacer 60 may comprise folds, waves (i.e., corrugation-like waves), corrugations, ridges, ribs, dimples, grooves, embossed bumps, and/or embossments within the support structure 50. According to various embodiments, the spacer 60 prevents two layers of the support structure 50 from nesting with each other and being substantially parallel to each other, which increases the overall thickness of two layers of the support structure 50 (as shown in FIGS. 15-17). Instead, as shown in FIGS. 15-17, the spacer 60 causes two layers of the support structure 50 to be substantial mirror images of each other. Accordingly, due to the spacer 60, the thickness of the first layer 82 and the thickness of the second layer 92 of the support structure 50 are each less than half of the distance 98 between the first layer outer surface 84 and the second layer outer surface 94 of the support structure 50 within the downstream gap 44.

According to one embodiment as shown in FIGS. 11A-11B, 13A-13B, and 15, the spacer 60 comprises at least one fold 72 formed within the support structure 50 in order to increase the transverse width or flow gap of the downstream gap 44 of the pleated filter media 40 and transverse intrinsic permeability of the filter element 30. The folds 72 are periodically positioned and spaced apart along the length of the support structure 50 (along the y-axis or the axial direction of the pleated filter media 40) and flow channels are formed between each of the folds 72. The folds 72 extend lengthwise along the transverse direction (e.g., along the z-axis) of the pleated filter media 40 such that the each of the folds 72 aligns within itself within the downstream gap 44 (as shown in FIG. 15). The support structure 50 is folded along the radial direction (e.g., along the x-axis) of the pleated filter media 40 such that the folds 72 are oriented in the radial direction. Accordingly, the folds 72 are substantially perpendicular to the folds of the pleats 48 of the pleated filter media 40 (as shown in FIGS. 11A-11B).

Figure 13A:
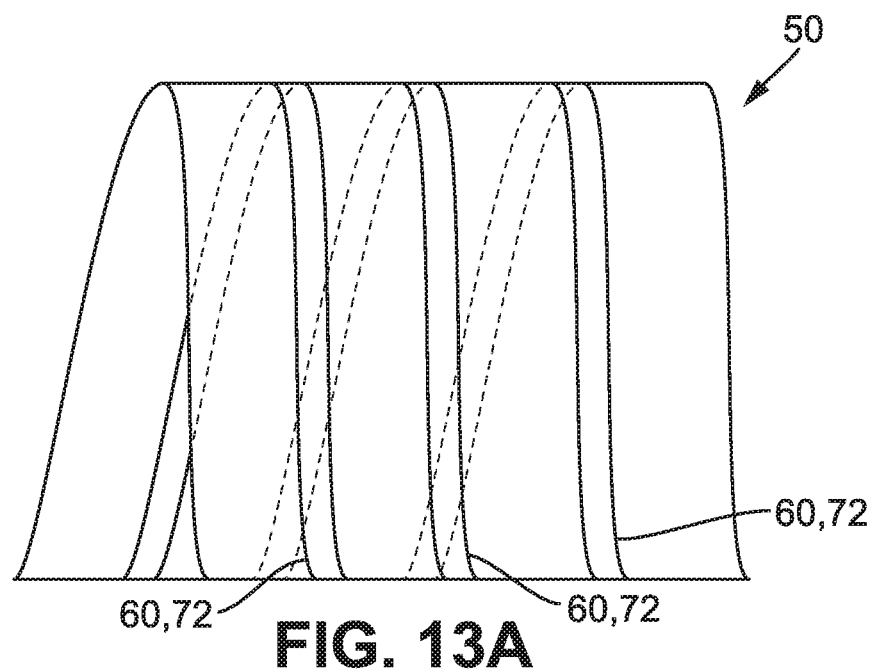
FIG. 13A is a perspective view of a support structure according to yet another embodiment.
Figure 13B:
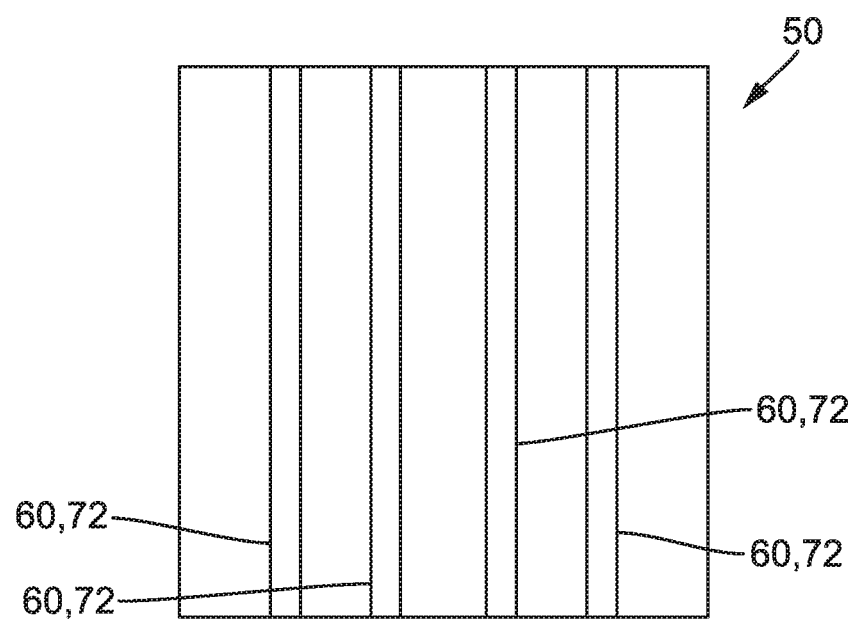
FIG. 13B is a plane view of the support structure of FIG. 13A.
Figure 13C:
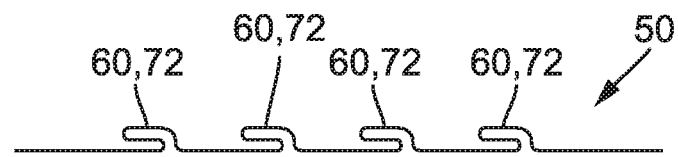
FIG. 13C is a cross-sectional view of the support structure of FIG. 13A.
Figure 14:
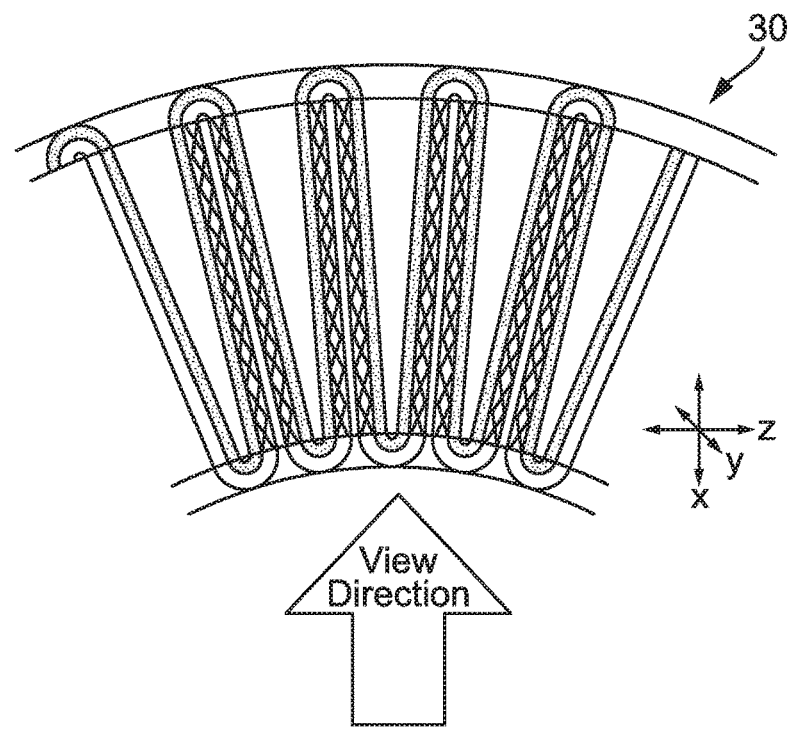
FIG. 14 is a cross-sectional view of a portion of a filter element showing a view direction.

As shown in FIGS. 13C and 15, the support structure 50 is folded over itself in order to create the fold 72 of the spacer 60. Accordingly, the support structure 50 is three layers thick (rather than one layer thick) along the fold 72 only and is one layer thick everywhere else. Accordingly, the localized thickness of the support structure 50 is increased along the fold 72 (compared to the thickness of one layer of the support structure 50), which increases the overall thickness of the support structure 50, thereby increasing the transverse width of the downstream gap 44 of the pleated filter media 40. The shape of the folds 72 may vary. For example, the individual folds 72 in the arrangement of FIG. 13C are "L" shaped.

Figure 12:
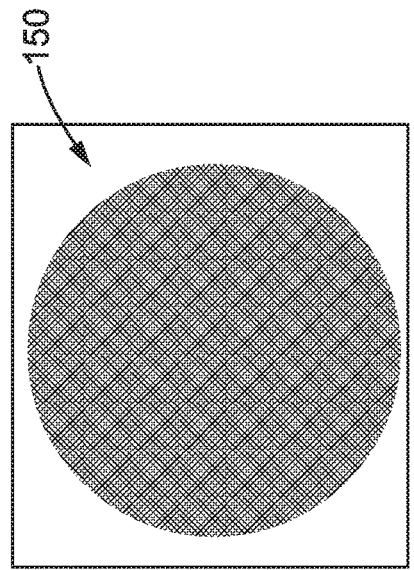
FIG. 12 is a plane view of a conventional support structure.

For comparison, a conventional support structure 150 is shown in FIG. 12. As shown, the conventional support structure 150 does not include any folds (unlike the support structure 50 shown in FIG. 11B) and is one layer thick. Accordingly, the overall thickness of the conventional support structure 150 is less thick than the overall thickness of the support structure 50 with the spacer 60. The intrinsic permeability of the conventional support structure 150 of FIG. 12 with a typical grate of pleated filter media for engine lube oils is 2,650 µm². The intrinsic permeability of the support structure 50 with the folds 72 (as shown in FIG. 11B) with the same material is 10,500 µm², which is significantly improved over the conventional support structure 150.

The width of the fold 72 depends on the desired configuration of the support structure. The downstream gap ratio of the filter element 30 with the support structure 50 with the folds 72 may range between approximately 0.1 to 0.5, depending on the compression and calendaring of the fold 72. According to one embodiment, the downstream gap ratio is approximately 0.33.

According to another embodiment as shown in FIG. 16, the spacer 60 comprises at least one wave, bump, formed feature, or corrugation 74 (referred to collectively as a "corrugation" herein) formed within the support structure 50 in order to increase the transverse flow gap of the downstream gap 44 of the pleated filter media 40 and transverse intrinsic permeability of the filter element 30. Similar to the folds 72, the corrugations 74 are periodically positioned and spaced apart along the length of the support structure 50 (along the y-axis or the axial direction of the pleated filter media 40). The corrugations 74 extend lengthwise along the transverse direction (e.g., along the z-axis) of the pleated filter media 40 such that the each of the corrugations 74 aligns within itself within the downstream gap 44 (as shown in FIG. 16). The support structure 50 is corrugated along the radial direction (e.g., along the x-axis) of the pleated filter media 40 such that the corrugations 74 are oriented in the radial direction. Accordingly, the corrugations 74 are substantially perpendicular to the folds of the pleats 48 of the pleated filter media 40.

The depth of the corrugations 74 depends on the desired configuration and transverse intrinsic permeability. The downstream gap ratio of the filter element 30 with the support structure 50 with the corrugations 74 may range between approximately 0.2 to 0.6, depending on the depth of the corrugations 74.

According to another embodiment as shown in FIG. 17, the spacer 60 comprises at least one bump, dimple, or ridge 76 (referred to collectively as a "ridge" herein) formed within the support structure 50 in order to increase the transverse flow gap of the downstream gap 44 of the pleated filter media 40 and transverse intrinsic permeability of the filter element 30. Similar to the folds 72, the ridges 76 are periodically positioned and spaced apart along the length of the support structure 50 (along the y-axis or the axial direction of the pleated filter media 40). The ridges 76 extend lengthwise along the transverse direction (e.g., along the z-axis) of the pleated filter media 40 such that the each of the ridges 76 aligns within itself within the downstream gap 44 (as shown in FIG. 17). The support structure 50 is bent along the radial direction (e.g., along the x-axis) of the pleated filter media 40 such that the ridges 76 are oriented in the radial direction. Accordingly, the ridges 76 are substantially perpendicular to the folds of the pleats 48 of the pleated filter media 40.

The depth of the ridges 76 depends on the desired configuration and transverse intrinsic permeability. The downstream gap ratio of the filter element 30 with the support structure 50 with the ridges 76 may range between approximately 0.2 to 0.6, depending on the depth of the ridges 76.

According to another embodiment as shown in FIGS. 18A-18B, the spacer 60 comprises a configuration where the radial-parallel wires 52 and the radial-normal wires 54 have two different diameters in order to increase the transverse flow gap of the downstream gap 44 of the pleated filter media 40 and transverse intrinsic permeability of the filter element 30. For example, the radial-parallel wires 52 have a larger wire diameter than the radial-normal wires 54. Accordingly, the radial-normal wires 54 are smaller fill or shute wires compared to the radial-parallel wires 52 and the radial-parallel wires 52 are larger warp wires.

As shown in FIG. 18A, the larger radial-parallel wires 52 are spaced from each other by a distance 55. As shown in FIG. 18B, the larger radial-parallel wires 52 are aligned with each other within the downstream gap 44, which increases the transverse flow gap of the downstream gap 44 and the transverse intrinsic permeability.

As shown in FIG. 18A, the thickness 51 (T) of one layer of the support structure 50 (as shown in FIG. 18A) is equal to the diameter ($d_w$) of radial-parallel wires 52 plus the diameter ($d_f$) of the radial-normal wires 54. Accordingly, as shown in FIG. 18B, the transverse flow gap 45 of the downstream gap 44 is equal two twice the thickness of one layer of the support structure 50 since the support structure 50 is doubled over within the downstream gap 44.

Figures 19, 20:
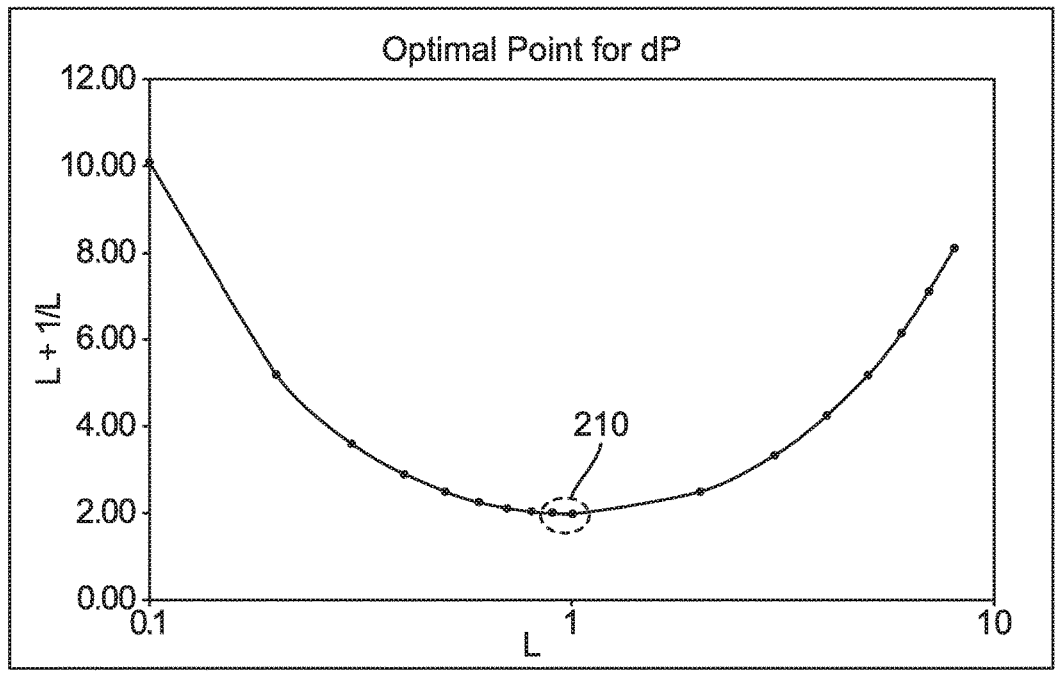
FIG. 19 is a chart showing a comparison between various measurements within conventional support structures and various embodiments of the support structure.
FIG. 20 is a graphical representation showing the optimal point for the differential pressure drop.

Compared to conventional support structures 150 that have a plain square weave, the support structure 50 with a plain square weave (or near-square weave) with wires 52, 54 that have different diameters creates a larger downstream gap 44. The approximately square-weave ratio of the support structure 50 may range from approximately 1:1 to 3:1. FIG. 19 depicts a comparison between various measurements within conventional support structures 150 and various embodiments of the support structure 50.

Since the support structure 50 provides a lower restriction than conventional support structures 150, the support structure has a much lower solidity compared to conventional support structures 150, as shown in FIG. 19. For example, conventional support structures 150 may have a plain dutch weave, a twill dutch weave or a similar mesh in order to provide greater mechanical strength and improved particle retention (by having smaller pore diameters) compared to typical square weave meshes with wires having the same diameter. Typical dutch weave meshes may have different wire diameters, which allow more wires to be used per inch. The ratio between diameters of the warp wire and the fill wire may range from 1:3 to 1:10. By increasing the number of wires within a typical dutch weave mesh, the mesh solidity can increase by at least 30% (compared to a less than 5% increase in typical square weave meshes). The increase in solidity and smaller pore size created by the spacing of the wires increases the particle removal of the mesh. Therefore, the conventional support structures 150 with a typical dutch weave mesh (even with wires that have different diameters) has a significantly higher restriction than the plain weave support structure 50 with wires 52, 54 that have different diameters.

As further shown in FIG. 19, the wire diameter ratio is equal to the diameter of the radial-parallel wires 52 divided by the diameter of the radial-normal wires 54. The wire diameter ratio of the support structure 50 ranges approximately from 2.0 to 4.0. The wire diameter ratio of a conventional support structure 150 with a typical dutch weave or twill dutch weave, however, is approximately 1.2 to 1.8.

Fluid Flow

The below equations govern the fluid flow in a cylindrical filter element.

$$\frac{du_1}{dx} = -2\frac{u_f}{T_1} \quad \text{Equation 1}$$

$$\frac{du_2}{dx} = \frac{2u_f}{T_2} \quad \text{Equation 2}$$

$$\left(\frac{du_1^2}{dx}\right) + \frac{1}{\rho}\frac{dP_1}{dx} + \frac{12\mu u_1}{\rho T_1^2} + \frac{\mu}{\rho \alpha_{MESH}} u_1 + \frac{C_2}{2} u_1^2 = 0 \quad \text{Equation 3}$$

$$\left(\frac{du_2^2}{dx}\right) + \frac{1}{\rho}\frac{dP_2}{dx} + \frac{12\mu u_2}{\rho T_2^2} + \frac{\mu}{\rho \alpha_{MESH}} u_2 + \frac{C_2}{2} u_2^2 = 0 \quad \text{Equation 4}$$

$$P_1 - P_2 = \frac{\mu}{\alpha} u_f t_m \quad \text{Equation 5}$$

However, if the upstream flow distribution is assumed to be uniform, the above equations may simplify to the following single equation.

$$\left(\frac{8}{T_2} u_f^2 x\right) + \frac{1}{\rho}\frac{dP_2}{dx} + \frac{12\mu u_2}{\rho T_2^2} + \frac{\mu}{\rho \alpha_{MESH}}\left[\frac{2u_f}{T_2} x\right] = 0 \quad \text{Equation 6}$$

The pressure drop across the pleated filter media is described by the below equation.

$$\Delta P_2 = \left\{\frac{u_f \mu}{\alpha_{Mesh} T_2}[L^2]\right\} + \frac{4\rho u_f^2}{T_2} L^2 \quad \text{Equation 7}$$

If the pressure loss is dominated by the first term in Equation 7, Equation 7 simplifies to the below equation, where L is the pleat depth, $T_2$ is the pleat spacing (assuming a constant pleat spacing from the inner diameter to the outer diameter of the pleated filter media), $\alpha_{Mesh}$ is the transverse intrinsic permeability of the support structure sandwiched between the pleats, u is the media face velocity, and μ is the fluid viscosity. $\alpha_{Mesh}$ is a function of $T_2$ and is not independent from $T_2$.

$$\Delta P_2 = \left\{\frac{u_f \mu}{\alpha_{Mesh} T_2}[L^2]\right\} \quad \text{Equation 8}$$

The pressure loss through the filter media is given by the below equation, where $\alpha_{Media}$ is the media intrinsic permeability and t is the media thickness.

$$\Delta P_1 = \left\{\frac{u_f \mu}{\alpha_{Media}} t\right\} \quad \text{Equation 9}$$

The overall pressure loss is given by the below equation.

$$\Delta P = \frac{u_f \mu}{\alpha_{Media}} t + \left\{\frac{u_f \mu}{\alpha_{Mesh} T_2}[L^2]\right\} \quad \text{Equation 10}$$

In Equation 10, $u_f$ is given by the below equation.

$$u_f = \frac{Q}{2LN_{Pleats} S_{HT}} \quad \text{Equation 11}$$

By simplifying further, the below equation is given for the overall pressure loss, where Q is the flow rate, $N_{pleats}$ is the number of pleats in the filter, and $S_{HT}$ is the slit height. The first term within the below equation is the pressure loss across the pleated filter media and the second term within the below equation is the pressure loss caused in the downstream gap of the pleated filter media due to the presence of the support structure and the tortuous path the support structure creates for the fluid flow exiting the downstream surface of the pleated filter media.

$$\Delta P = \frac{Q\mu}{2N_{Pleats}S_{HT}}\left[\left\{\frac{t}{L\alpha_{Media}}\right\} + \left\{\frac{L}{\alpha_{Mesh}T_2}\right\}\right] \quad \text{Equation 12}$$

According to the above equations, it is shown that the pressure loss and the pleat depth are related in a complex manner. As shown in FIG. 20, there is an optimal point 210 for the initial pressure loss across the pleated filter media calculated based on the below equation for pressure loss.

$$\Delta P \propto \left[L + \frac{1}{L}\right] \quad \text{Equation 13}$$

Additionally, the pressure loss is inversely related to $\alpha_{Mesh}$. Accordingly, the pressure loss increases when the $\alpha_{Mesh}$ decreases. Therefore, a support structure that can provide the same structural functionality, but at a higher intrinsic permeability will perform better than a support structure with a lower intrinsic permeability (from a pressure loss perspective).

Analysis

According to fluid-dynamic model calculations, the spacer may, for example, decrease the differential pressure drop of a lube filter element with a conventional support structure 150 that does not include a spacer compared to the presently disclosed filter element 30 with the spacer by as much as 60% (depending on operating conditions).

Figure 21:
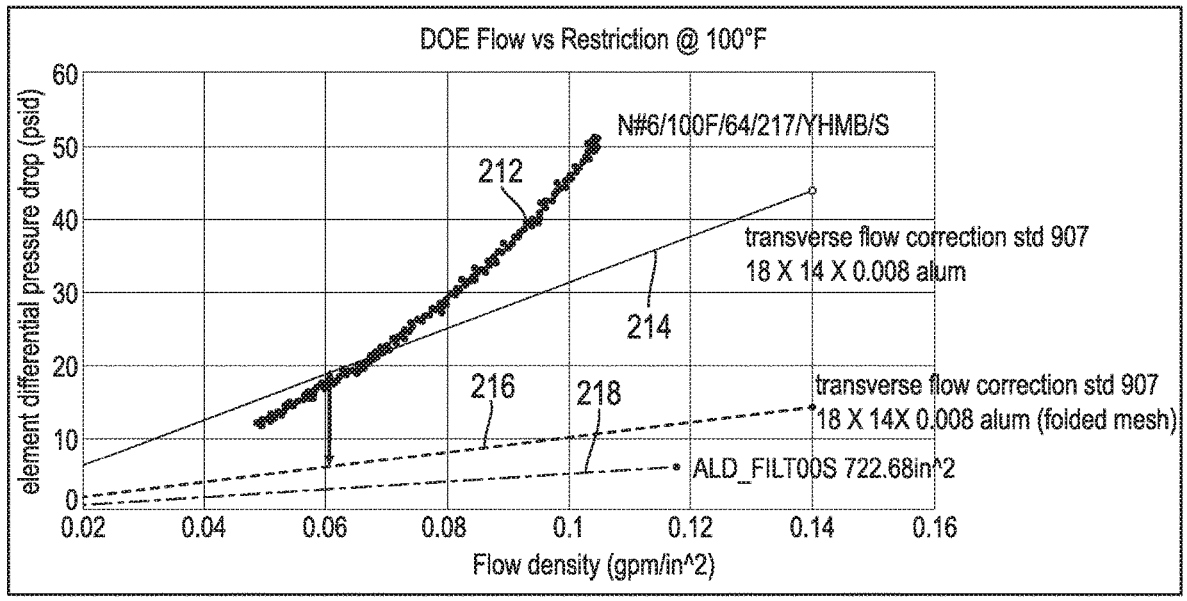
FIG. 21 is a graphical representation showing the fluid flow compared to the restriction.

FIG. 21 shows the pressure drop and the flowrate improvement of including the spacer 60 within the filter element. Specifically, FIG. 21 shows fluid-dynamic model calculations of how the element differential pressure drop changes according to the flowrate of an oil test-liquid at 100° F. and specifically compares the performance of a conventional filter element to the present filter element 30 (that comprises the support structure with the spacer). The curve 212 shows actual test data. The line 214 is based on fluid-dynamic model calculations using the conceptual intrinsic permeability of a conventional support structure 150. The line 216 is based on fluid-dynamic model calculations that use the conceptual intrinsic permeability of the support structure 50 with the fold 72.

As shown, the differential pressure drop across the conventional support structure 150 (see line 214) compared to the support structure 50 with the fold 72 (see line 216) was reduced from 19.0 psid to 6.0 psid (at a flow density of approximately 0.06 gpm/in², which is a typical lube flow rate). Accordingly, the initial differential pressure drop was reduced by 68%.

The line 218 shows an entitlement differential pressure drop objective with zero pressure losses aside from losses due to pleated filter media permeability itself (comparable to, for example, flow through a "flat sheet" of filter media). As shown, line 216 (based on fluid-dynamic model calculations using the conceptual intrinsic permeability of the support structure 50 with the fold 72) is relatively close to line 218 compared to line 214 (based on fluid-dynamic model calculations using the conceptual intrinsic permeability of a conventional support structure 150).

Figure 22:
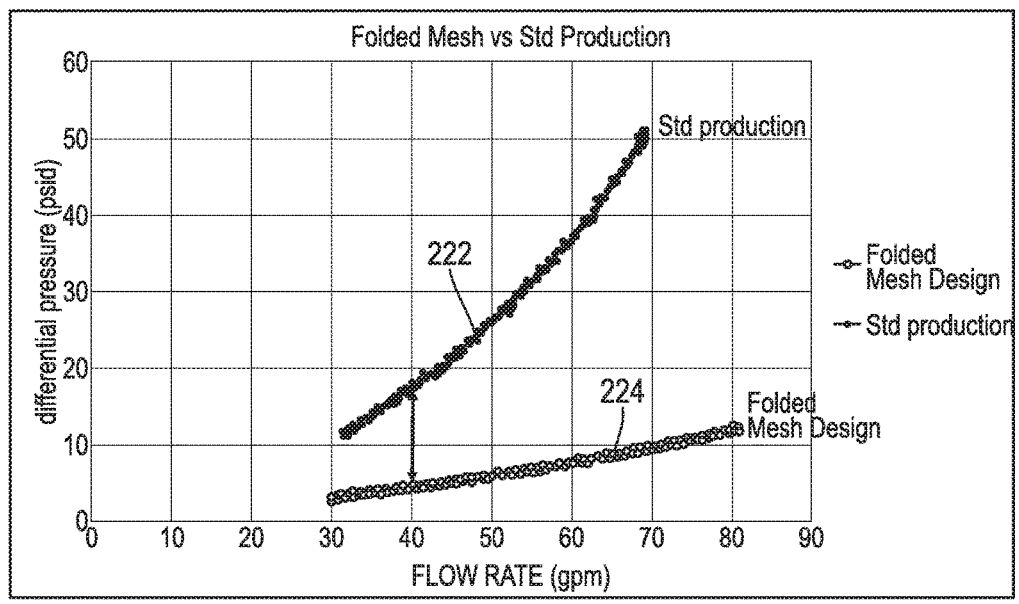
FIG. 22 is a graphical representation comparing the differential pressure drop of a conventional support structure to a support structure with a spacer.

FIG. 22 shows how the differential pressure is affected by the flow rate at a temperature of 100° F., a viscosity of 113 centipoise (cP), and with a 15 W-40 engine oil marketed under the Premium Blue® name. Curve 222 shows the actual test data from a conventional filter element 130 with a conventional support structure 150. Curve 224 shows the filter element 30 with the support structure 50 with the folds 72 (as shown in FIG. 11A). As shown in FIG. 22, including the folds 72 provides a four times reduction of the differential pressure drop at 40 gallons per minute (gpm).

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter element for filtering a fluid, the filter element comprising:

a pleated filter media comprising pleats that define an upstream gap along an upstream surface of the pleated filter media and a downstream gap along a downstream surface of the pleated filter media; and a support structure extending along the downstream surface of the pleated filter media and supporting the pleats, the support structure folded into a first layer and a second layer within the downstream gap of the pleated filter media, the first layer comprising a first layer outer surface and a first layer inner surface, the second layer comprising a second layer outer surface and a second layer inner surface, the first layer inner surface and the second layer inner surface positioned adjacent to each other within the downstream gap, the support structure comprising at least one spacer that separates the first layer outer surface and the second layer outer surface, the at least one spacer comprising a folded portion of the support structure, the support structure being three layers thick along the folded portion.

2. The filter element of claim 1, wherein a thickness of the first layer of the support structure is less than half of the distance between the first layer outer surface and the second layer outer surface.

3. The filter element of claim 1, wherein the at least one spacer comprises a plurality of folds spaced apart along a length of the support structure, and wherein flow channels are formed between each of the plurality of folds.

4. A filter cartridge configured for attachment to a filter head in a filtration system, the filter cartridge, comprising:
a filter housing; and
a filter element positioned within the filter housing, the filter element comprising:
a first endplate;
a second endplate;
a pleated filter media extending between the first endplate and the second endplate, the pleated filter media comprising pleats that define an upstream gap along an upstream surface of the pleated filter media and a downstream gap along a downstream surface of the pleated filter media; and a support structure extending along the downstream surface of the pleated filter media and supporting the pleats, the support structure folded into a first layer and a second layer within the downstream gap of the pleated filter media, the first layer comprising a first layer outer surface and a first layer inner surface, the second layer comprising a second layer outer surface and a second layer inner surface, the first layer inner surface and the second layer inner surface positioned adjacent to each other within the downstream gap, the support structure comprising at least one spacer that separates the first layer outer surface and the second layer outer surface;

wherein the support structure is folded over itself so as to create at least one fold of the at least one spacer, resulting in the support structure being three layers thick along the at least one fold.

5. The filter cartridge of claim 4, wherein the support structure comprises a plurality of folds spaced apart along a length of the support structure, and wherein flow channels are formed between each of the plurality of folds.

6. The filter cartridge of claim 5, wherein the plurality of folds extend lengthwise along a transverse direction of the pleated filter media such that each of the plurality of folds aligns within itself within the downstream gap.

7. The filter cartridge of claim 6, wherein the support structure is folded along a radial direction of the pleated filter media such that the plurality of folds are oriented in the radial direction.

* * * * *